United States Patent
Jäger et al.

(10) Patent No.: US 11,155,415 B1
(45) Date of Patent: Oct. 26, 2021

(54) BELT CLIP SET, ROD BELT, AND METHOD FOR AFFIXING THE BELT CLIP SET ON A ROD BELT

(71) Applicant: ARNOLD JÄGER HOLDING GMBH, Hannover (DE)

(72) Inventors: Sebastian Jäger, Hannover (DE); Arjan Mulder, Veendam (NL)

(73) Assignee: ARNOLD JÄGER HOLDING GMBH, Hannover (DE)

( * ) Notice: Subject to any disclaimer, the term of this patent is extended or adjusted under 35 U.S.C. 154(b) by 0 days.

(21) Appl. No.: 16/917,045

(22) Filed: Jun. 30, 2020

(51) Int. Cl.
*B65G 15/52* (2006.01)
*A01D 61/02* (2006.01)
*F16G 3/08* (2006.01)

(52) U.S. Cl.
CPC ............. *B65G 15/52* (2013.01); *A01D 61/02* (2013.01); *F16G 3/08* (2013.01)

(58) Field of Classification Search
CPC ... B65G 15/52; F16G 3/00; F16G 3/02; F16G 3/04; F16G 3/08; F16G 3/09
See application file for complete search history.

(56) References Cited

U.S. PATENT DOCUMENTS

| | | | |
|---|---|---|---|
| 3,638,281 A * | 2/1972 | Francois | F16G 3/02 24/31 B |
| 4,815,587 A * | 3/1989 | Musil | B65G 15/52 198/728 |
| 5,099,548 A * | 3/1992 | Loosli | B65G 15/52 198/844.2 |
| 5,360,103 A * | 11/1994 | Loosli | B65G 15/30 198/844.2 |
| 5,692,598 A | 12/1997 | Rohrs | |
| 6,370,739 B1 * | 4/2002 | Jakob | F16G 3/02 24/31 B |
| 8,720,675 B2 | 5/2014 | Gentz | |
| 10,414,592 B2 | 9/2019 | Van Wolde | |
| 2017/0023101 A1 | 1/2017 | Jäger | |
| 2020/0189849 A1 | 6/2020 | Jäger | |

FOREIGN PATENT DOCUMENTS

| | | |
|---|---|---|
| DE | 19520927 A1 | 12/1996 |
| DE | 29716331 U1 | 12/1997 |
| DE | 10037640 C1 | 2/2002 |
| DE | 102006022011 B3 | 7/2007 |
| EP | 2584218 A2 | 4/2013 |
| EP | 3078880 A1 | 10/2016 |
| EP | 3345474 A1 | 7/2018 |

\* cited by examiner

*Primary Examiner* — William R Harp
(74) *Attorney, Agent, or Firm* — Barnes & Thornburg LLP

(57) ABSTRACT

The present disclosure relates to a belt clip set comprising a belt clip and at least two pilot bolts, the belt clip comprising a first leg having at least two guide openings and a second leg having at least two thread openings each associated with the guide openings. Each pilot bolt comprising a threaded region with an external thread, a bolt head for tightening the pilot bolt, and a tapered pin opposite the bolt head, where each pilot bolt can be received with some play in one of the guide openings in the first leg and via its threaded region screwed into the respective associated thread opening in the second leg, where each pilot bolt can be received with some play in one of the guide openings in the first leg and via its threaded region screwed into the respective associated thread opening in the second leg.

14 Claims, 3 Drawing Sheets

BELT CLIP SET, ROD BELT, AND METHOD FOR AFFIXING THE BELT CLIP SET ON A ROD BELT

BACKGROUND

The present disclosure relates to a belt clip set, a rod belt for rod belt conveyors, in particular for agricultural machines, and a method for affixing the belt clip set on a rod belt.

SUMMARY

According to the present disclosure, a belt clip set is provided comprising a belt clip and at least two, preferably at least four, pilot bolts. The belt clip comprises a first leg with at least two guide openings and a second leg with at least two thread openings associated with the guide openings. Hereby, the association is given by the arrangement of the openings whereby they lie on top of one another so that a pilot bolt inserted into a guide opening automatically reaches the associated thread opening.

In illustrative embodiments, the pilot bolts each comprise a threaded region with an external thread, a bolt head for tightening or, respectively, screwing in the pilot bolt and a tapered pin opposite the bolt head. Each of the pilot bolts can be received, with some play in the direction of transport of a clampable belt, in one of the guide openings in the first leg and screwed via its threaded region or, respectively, via the external thread into the respectively associated thread opening in the second leg. Moreover, the legs of the belt clip are connected to one another such that the two legs can be drawn tight by tightening the at least two pilot bolts screwed into the thread openings and received in the guide openings with some play. This makes it possible for a belt end of a belt extended in the direction of transport, which can be positioned between the two legs, to be clamped in between the two legs.

In illustrative embodiments, receiving the pilot bolt in the guide opening with some play makes it possible for the pilot bolts to move therein with some play. When the two legs of the belt clip move towards each other upon tightening of the pilot bolts, the relative position of the thread openings to the guide openings changes, too. Without such area of movement the pilot bolts would press laterally against the guide openings resulting in transverse forces acting upon the pilot bolts. Due to the play, such transverse forces can be reduced or avoided. Even installation and manufacturing tolerances, resulting in a position of the pilot bolts not exactly perpendicular, can be compensated hereby.

In illustrative embodiments, because transverse forces in the guide opening are reduced, this results in minimized frictional forces on contact faces between the pilot bolt, in particular beneath the bolt head, and the respective guide opening, and the bending moments within the pilot bolt will also be reduced. As a result, a clamping force may be transmitted to the leg almost losslessly, at least via the bolt head, when the pilot bolt is tightened so that almost the entire force transmittable by the pilot bolt can be made available for clamping the belt between the two legs. This makes the belt connection more reliable overall.

In illustrative embodiments, the respective guide opening in the first leg is designed as an extended oblong hole so that the pilot bolt or, respectively, the threaded region can be received in the respective guide opening with sufficient play. The oblong hole is shaped such that the pilot bolt, when the belt clip is mounted on the belt, does not come into contact with end regions of the guide openings or comes into contact therewith in a manner accurately fitting, i.e. touching slightly, if at all. Thus, the oblong hole can compensate the full change in position between the thread opening and the guide opening upon tightening of the pilot bolt. This can entirely avoid transverse forces on the pilot bolt so that the clamping effect is further optimized. Also, due to the accurate fitting, the contact surface between bolt and leg can be increased, thereby improving the clamping effect even further.

In illustrative embodiments, the rod belt for rod belt conveyors, in particular of agricultural machines, according to the present disclosure is provided with transverse rods arranged perpendicular to a direction of transport and parallel to one another, whereby the transverse rods are attached to continuous elastic belts with tensile strength running parallel to one another in a pre-determined rod spacing. Belt clips are mounted in the region of belt ends of the respective belt, the belt clips of the same belt being connected to one another for making the belt continuous so that two belt clips form one belt lock.

In illustrative embodiments, each belt clip comprises a first leg with at least two guide openings which are preferably designed as oblong holes extended in the direction of transport of the belts, and a second leg with at least two thread openings associated each with the guide openings. Hereby, the belt clips are the belt clips of the belt clip set according to the present disclosure which are affixed to the belt ends via the at least two, preferably four pilot bolts. Each of the pilot bolts is received with some play at least in the direction of transport in one of the guide openings in the first leg and screwed via its threaded region or, respectively, the external thread into the respectively associated thread opening in the second leg. The two legs are connected to one another and drawn tight, by virtue of the tightening of the at least two pilot bolts screwed into the thread openings and received in the guide openings with some play, in such a way that the belt end of the respective belt positioned between the two legs is clamped in between the two legs. Hereby, preferably, the guide openings or, respectively, the oblong holes are designed such that the pilot bolts in the longitudinal direction do not come into contact with end regions of the guide openings or are in accurately fitting contact therewith so as to optimize the clamping effect.

In illustrative embodiments, for creating the belt lock from the belt clips the two legs of the belt clip are connected to one another preferably via bearing eyes, whereby the bearing eyes of belt clips which are arranged on different belt ends of the same belt are joined in the manner of hinges and pivoting connected to one another via a bearing bolt so as to render the belt continuous.

In illustrative embodiments, it may further be provided for the belt clips to comprise a first receiving region in the first leg and/or a second receiving region in the second leg, the first leg and/or the second leg being shaped in the respective receiving region in such a way that the shape of the respective leg is adapted to a shape of the belt with or without a transverse rod on top thereof for clamping the belt together with a transverse rod on top thereof or without a transverse rod on top thereof.

In illustrative embodiments, a method for affixing a belt clip of an above described belt clip set onto a belt end of a belt of a rod belt for rod belt conveyors includes at least the following steps:

positioning the belt end of the belt between the legs of a belt clip provided;

tightening the two legs by means of at least two pilot bolts for clamping the belt end of the belt, in that each pilot bolt is positioned, with the pin ahead, in of the guide openings in the first leg of the belt clip;

a force and/or a rotation is exerted on the respective positioned pilot bolt so as to thrust the pilot bolt through the belt in a channel, which is preferably formed by the pin itself in the belt when the force and/or the rotation is exerted on the pilot bolt, until the threaded region of the pilot bolt is in contact with the respectively associated thread opening in the second leg of the belt clip;

the pilot bolt is tightened so that the pilot bolt with the threaded region or, respectively, the external thread is screwed into the associated thread opening, whereby the two legs are drawn tight as soon as the bolt head of the respective pilot bolt retains the first leg, whereby the pilot bolt is received with some play in the guide opening so that the pilot bolt can move in the guide opening upon exertion of a force and/or a rotation on the pilot bolt as well as upon and/or after tightening of the pilot bolt.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 shows a rod belt with belt clips affixed to its ends;

FIG. 1a a detailed view of the mounted belt clip according to FIG. 1;

DETAILED DESCRIPTION

Figure 1:
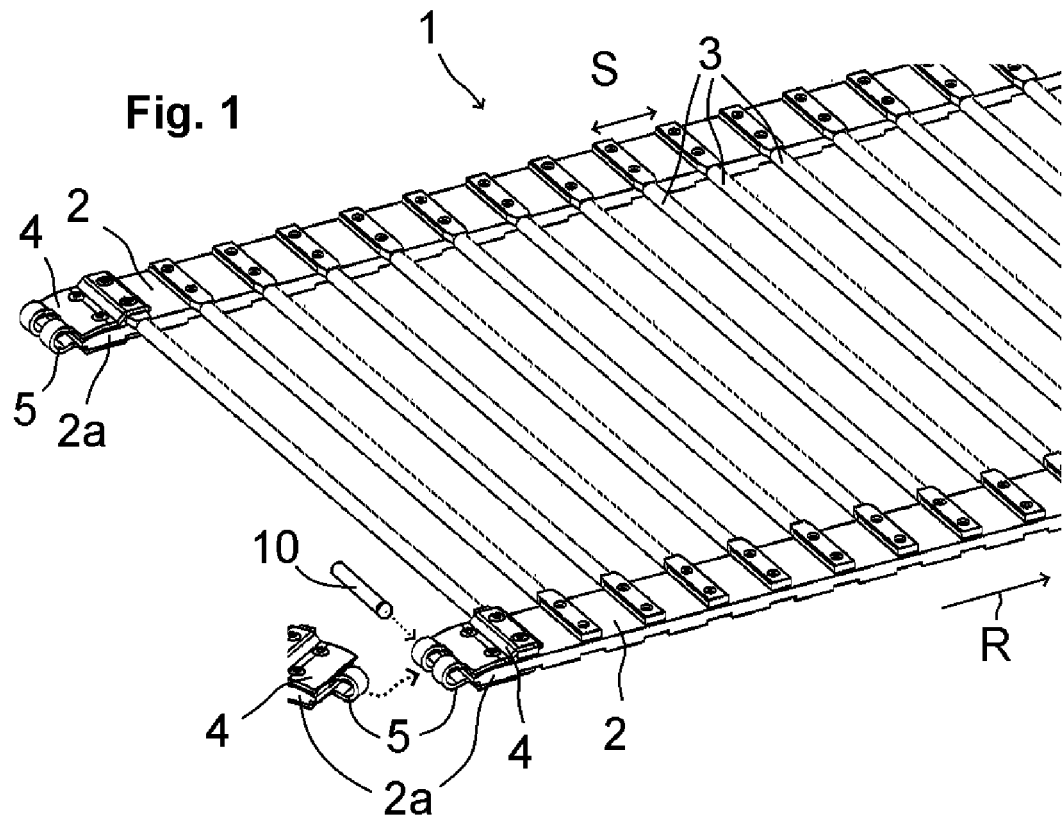

In FIG. 1 a rod belt 1 is depicted comprising two elastic belts 2 with tensile strength running parallel to one another and comprising a polymer reinforced by fabric layers, and which are connected to one another by means of a plurality of transverse rods 3 arranged perpendicular to the direction of transport R of the rod belt 1 and parallel to one another at a rod spacing S. All belts 2 are being joined at their respective end to be continuous (endless). For that purpose, a belt clip 4 with bearing eyes 5 is arranged at each belt end 2a. The bearing eyes 5 of two belt clips 4 located at the ends may engage with each other in the manner of a hinge such that a connecting bolt 10 can be pushed through the bearing eyes 5 of both belt clips 4, as shown schematically in FIG. 1. This makes it possible for the two open belt ends 2a of the respective belt 2 to be joined permanently so as to make the belt 2 endless.

Figure 1A:
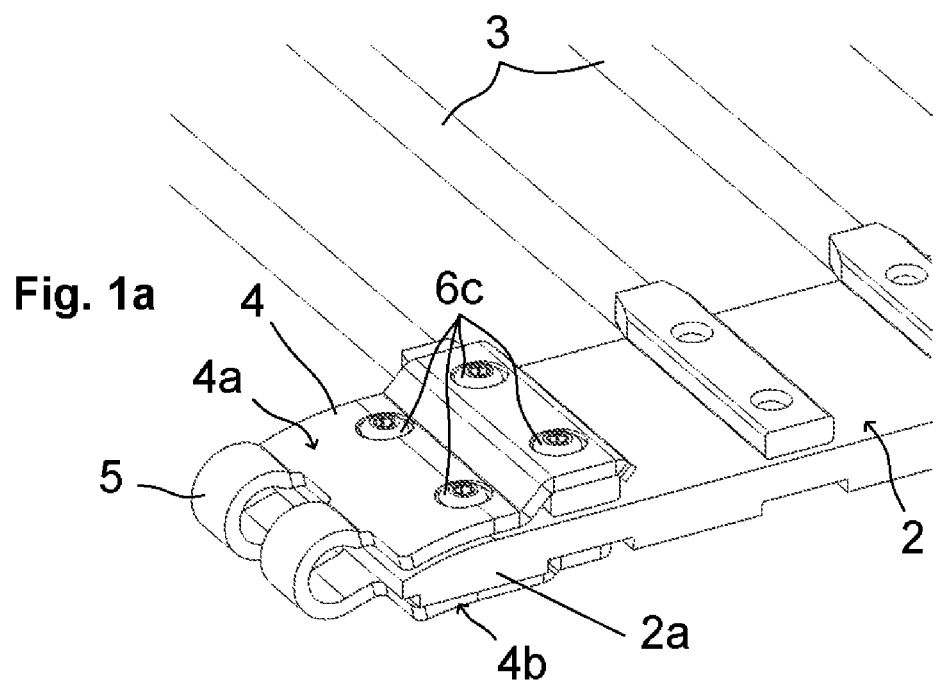
Figure 2:
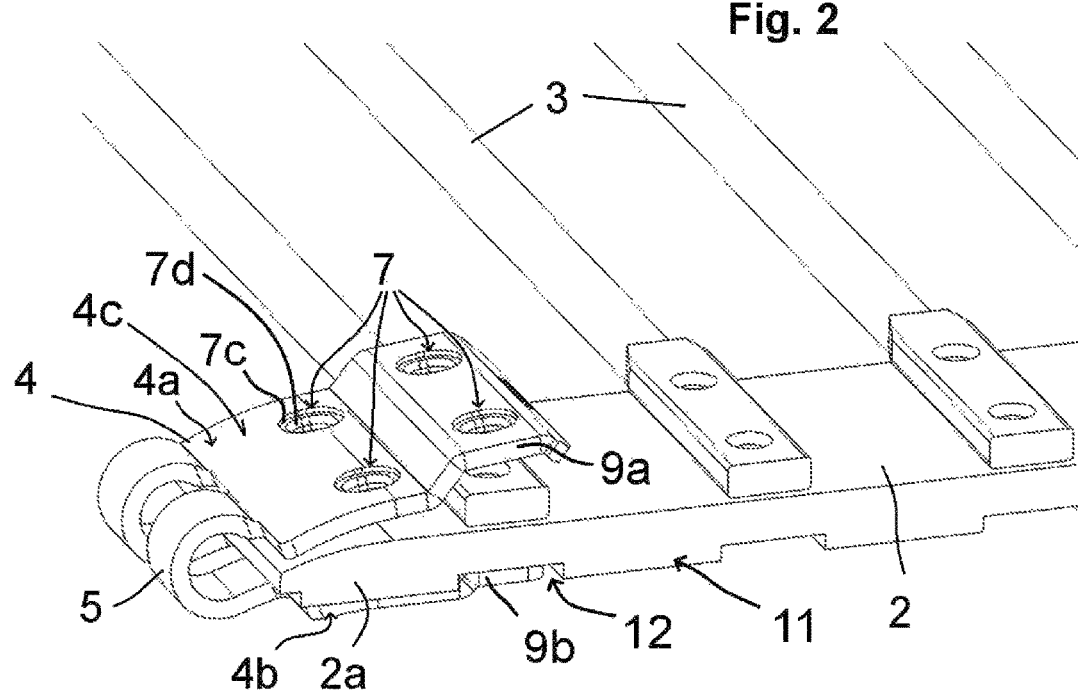
FIG. 2 shows an opened belt clip without a pilot bolt.

According to FIG. 1a, a belt clip 4 comprises two legs 4a, 4b that are joined via the bearing eyes 5. In the assembled state the respective belt end 2a is clamped in between the two legs 4a, 4b, and the two legs 4a, 4b lie approximately parallel to one another. Prior to assembly of the belt clip 4 the two legs 4a, 4b are open by about 10° to about 30°, according to FIG. 2, so as to allow the respective belt end 2a to be received. Opening and pinching of the legs 4a, 4b is enabled by the elastic design of the belt clip 4, in particular, in the region of the bearing eyes 5. To that end, the belt clip 4 is made, for example, as a single piece of metal.

Figure 3:
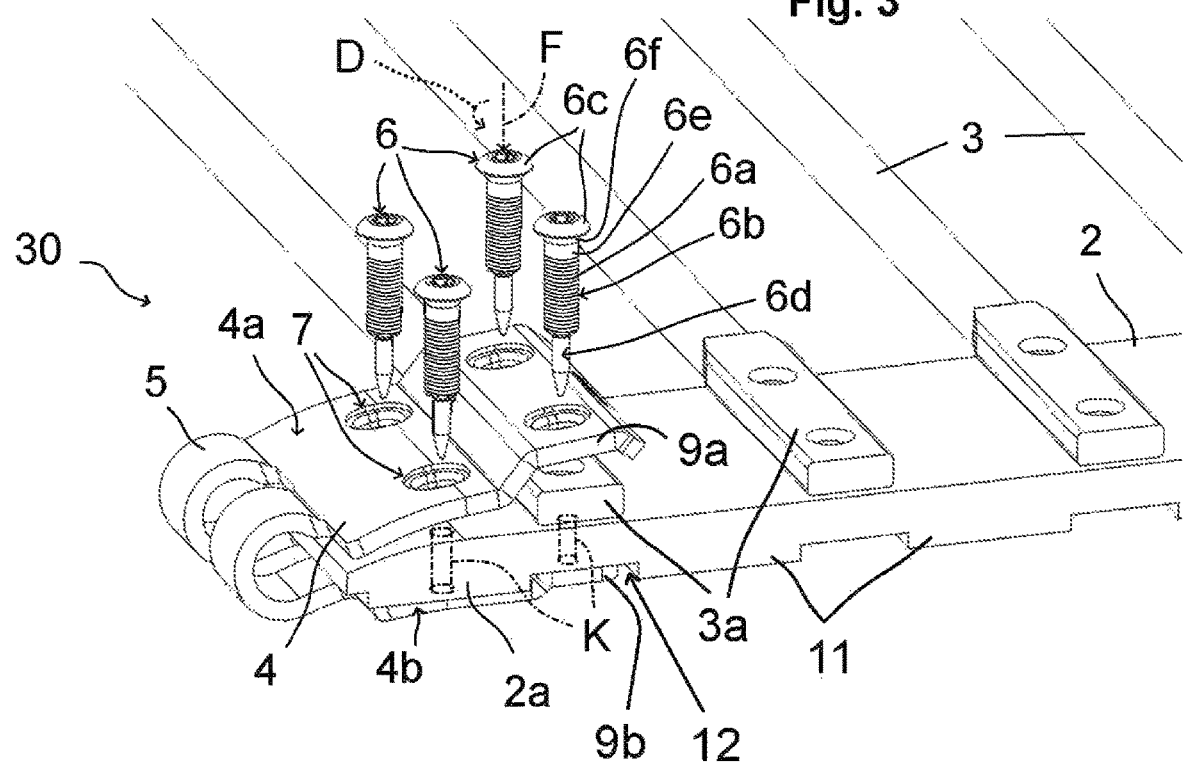
FIG. 3 show a belt clip set with opened belt clip and pilot bolt for assembly.
Figure 4:
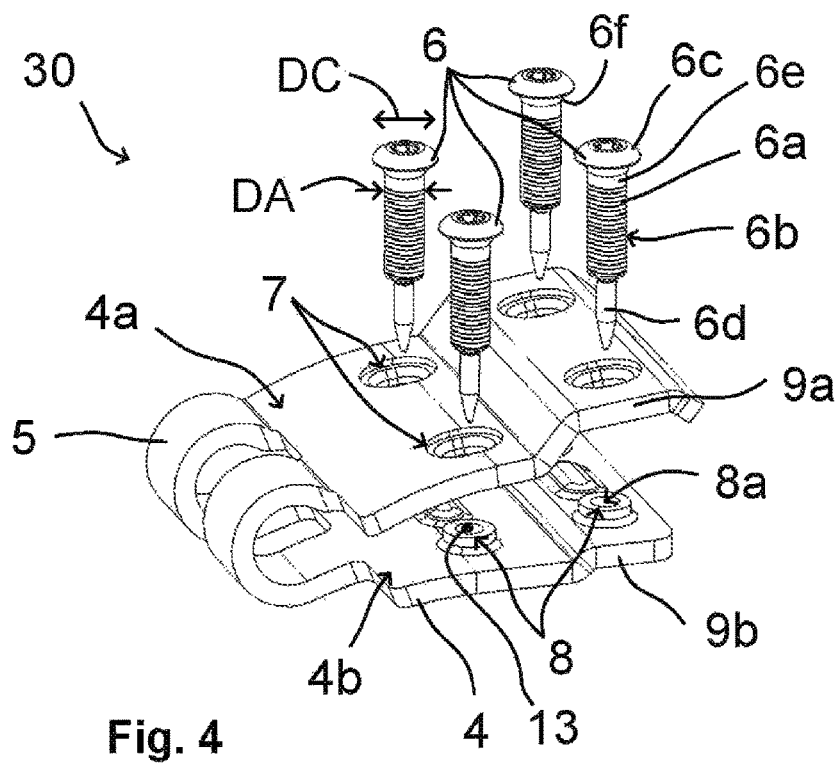
FIG. 4 is a detailed view of the belt clip set according to FIG. 3.

According to FIG. 3, the belt clip 4 is affixed to the respective belt end 2a via four pilot bolts 6, which make up a belt clip set 30 together with the belt clip 4 (see FIG. 4). Each of the pilot bolts 6 comprises a threaded region 6a with an external thread 6b as well as a tapered pin 6d opposite the bolt head 6c. Above the threaded regions 6a there is provided a non-threaded region 6e which merged upwards into a sloped region 6f. This is followed by the bolt head 6c.

The pilot bolts 6 are positioned, with the pin 6d ahead, in guide openings 7 in the upper first leg 4a. By exerting a force F directed perpendicular to the belt 2 and/or a torque D onto the respective pilot bolt 6 the pointed pin 6d penetrates the belt 2 thereby creating a channel K (schematically in FIG. 3). This renders a prior perforation of the belt 2, as it may be used with rivet joints, unnecessary. Subsequently, the pin 6d reaches a thread opening 8 in the lower second leg 4b associated with one of the guide openings 7 (FIG. 4).

Under continued exertion of force and/or rotation the threaded region 6a of the respective pilot bolt 6 is pushed through the channel K in the belt 2 created by the pin 6d until the external thread 6b engages with an interior thread 8a in the thread opening 8 in the second leg 4b. When the threaded bolt 6 is subsequently tightened further via the bolt head 6c at a torque D which may be pre-determined, then the two legs 4a, 4b are drawn tight. Hereby, the belt 2 can be clamped in between the two legs 4a, 4b. In addition, the interior thread 8a may be provided with substance-to-substance bond 13 (s. FIG. 4), for example a glue, so as to secure the pilot bolt 6 against undesired detachment in operation of the rod belt 1.

Figure 4A:
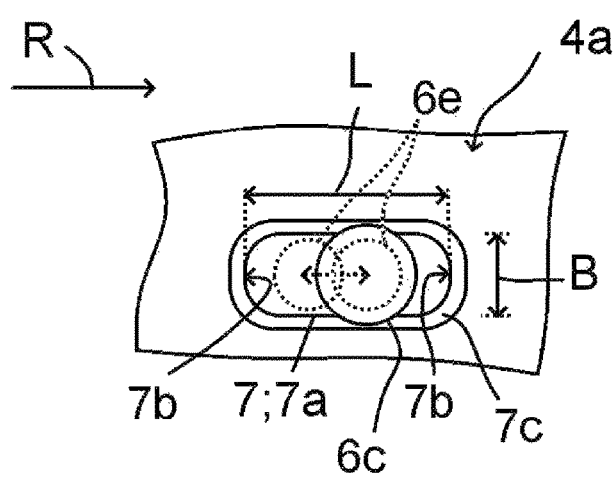
FIGS. 4a and 4b are a detailed view of a guide opening of the belt clip.

The bolt head 6c has a bolt head diameter DC that is larger than an interior width B (perpendicular to the direction of transport R) of the guide opening 7 (see FIG. 4a). Moreover, the pilot bolt 6 has a bolt diameter DA beneath the bolt head 6c that is smaller than the interior width B of the guide opening 7 so that the pilot bolt 6 upon tightening and even after being tightened is received in the guide opening 7 with some play. Thereby, alone, the pilot bolt 6 is given a small area of movement (perpendicular to the direction of transport R) in the guide opening 7. The interior width B can be, for example, about 7 mm, and the bolt diameter DA in the non-threaded region 6e, for example, about 6 mm.

The way of assembling the belt clip 4 described above can be attained in a simple manner by exerting a force F and/or a torque D onto the or, respectively, via the bolt heads 6c, for example, using a cordless screwdriver. After assembly the pin 6d protruding from the second leg 4b can be knocked off from the pilot bolt 6 so as to not impede the circulation of the rod belt 1.

With such an assembly the guide openings 7 in the first leg 4a shift slightly in relation to the respective associated underlying thread openings 8 in the second leg 4b because the angle between both legs 4a, 4b changes as a result of the tightening. Further, it may occur that the pilot bolts 6 upon exertion of force or rotation via the cordless screwdriver are pushed through the belt into the thread openings 8 in a manner not exactly perpendicular. In order to take this into account the bearing of the pilot bolt 6 in the respective guide opening 7 is provided with some play, this play can be optimized in that the guide openings 7 in the first leg 4a are designed as oblong holes 7a extended in the direction of transport R and having a length L of at least 7.2 mm or, respectively, at least 1.2 time the bolt diameter DA. Thus, the guide openings 7 have main axes of differing extension or, respectively, the length L of the guide opening 7 differs from its interior width B.

Therefore, when the two legs 4a, 4b move towards each other upon tightening, the pilot bolt 6 can move inside the oblong hole 7a in the direction of transport R from the open hinge side towards the closed hinge side (indicated by a dotted line in FIG. 4a), preferably without the pilot bolt 6 coming into contact with end regions 7b of the oblong hole 7a. Possibly, the pilot bolt 6 may even come into contact with one of the end regions 7b of the oblong hole 7a in a manner accurately fitting, i.e. touching slightly at most and without exerting any relevant force.

Thereby, transverse forces acting on the pilot bolts 6 can be avoided because the pilot bolt 6 is given additional area of movement in the direction of transport R in the region of the guide openings 7. Therefore, a clamping force can be transmitted almost without loss, at least via the bolt head 6c, when the pilot bolt 6 is tightened because frictional forces in the region of the guide openings 7 and bending moments in the pilot bolt 6 are avoided. This makes it possible to make the full force transmittable by the pilot bolt 6 available for clamping the belt 2 between the two legs 4a, 4b. By virtue of the accurately fitting contact in the respective end region 7b the contact surface between the pilot bolt 6 and the upper leg 4a can be increased, resulting in an overall improved clamping effect.

Figure 4B:
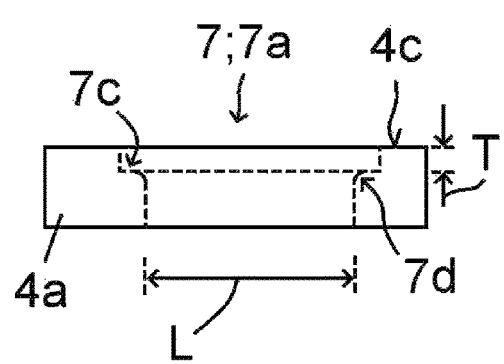

In order to further provide the clamping effect, circumferential planar recesses grooves 7c are arranged in upper first leg 4a in the region of the oblong holes 7a (see FIGS. 2, 4a, 4b) in which the bolt head 6c can be received. This provides a defined contact surface upon which the bolt head 6c can rest in a planar manner for a transmission of force. This can be improved, according to FIG. 4b, by means of a bevel 7d of the oblong hole 7a at the transition to the recesses 7c, whereby the sloped region 6f of the pilot bolt 6 lies in contact with the bevel 7d in the assembled state thereby further increasing the contact surface and also achieving a self-centering inside the oblong hole 7a.

Further, a depth T of the planar recesses 7c is selected such that the bolt heads 6c in the assembled state lie, at least in part, beneath a surface 4c of the first legs 4a. This protects the bolt heads 6c in operation of the rod belt 1 from damage as well as from wear so that the belt clip 4 can also later be disassembled in a controlled manner and the clamping effect created via the bolt heads 6c is guaranteed to be durable in operation.

As illustrated in FIGS. 3 and 4, the belt clip 4 may comprise an additional first receiving region 9a on the first leg 4a. To that end, the first leg 4a bent or, respectively, shaped in such a way that a preferably flattened and perforated receiving region 3a of the transverse rod 3 can also be received and clamped by the belt clip 4. In the case of the above-described type of affixing via the pilot bolts 6, the pin 6d is first inserted through the perforation in the receiving region 3a and is subsequently able to penetrate the belt 2 through the exertion of force and/or a torque D, as described above.

Thus, the contact surface 3a of the transverse rod 3 can be clamped between the legs 4a, 4b together with the belt 2 by tightening the pilot bolts 6 so that a common fixation is possible. Hereby, a pre-determined rod spacing S can be continued also in the connection region of the belt ends 2a and, at the same time, a secure fixation of the belt clip 4 can be guaranteed because the legs 4a, 4b can be affixed via the pilot bolts 6 to the belt ends 2a in a wide area. In principle, the fixation of the transverse rod 3 on the edge by means of the belt clip 4 can even be omitted. In that case, the first leg 4a will lie planar on the belt 2. Then, the transverse rod 3 on the edge will be omitted or affixed to the belt 2 in some other way. However, the belt clip 4 may be designed shorter and then be affixed to the belt 2 via two pilot bolts 6.

According to FIGS. 3 and 4, the second leg 4b may be bent also in a second receiving region 9b. If there are, for example, cams 11 or other elevations at the underside of the belt 2, then the second 4b can engage with the bent second receiving section 9b in recesses 12 between the cams 11. Thus, the shape of the first and/or the second legs 4a, 4b can be adapted to the contours of the upper side or, respectively, underside of the belt 2 by means of potential further elements.

Comparative rod belts for rod belt conveyors of agricultural machines comprise two or more tension-proof, elastic and continuous (endless) belts as traction means that run parallel to one another and are connected to one another by a plurality of transverse rods arranged perpendicular to the direction of transport and parallel to one another. For the purpose of attaching the transverse rods to the belts the transverse rods are provided with flattened and perforated contact regions by means of which they are in contact with the belt.

For the purpose of creating comparative continuous belts of the rod belt, the belt ends of the belt are connected to each other. To that end, the belt ends may, for example, be placed on top of one another in a graded or interwoven manner and connected to each other directly, for example, by vulcanization, or by means of screw bolts.

Alternatively, or additionally, a comparative belt lock may be utilized connecting the belt ends to one another in a suitable manner. Further comparative belt locks are formed by belt clips which can be affixed to one side of the respective belt by means of pilot bolts and pivoting connected to one another.

A disadvantage with comparative belt locks is that after disassembly of a defective belt lock it is difficult to simply and reliably install a new belt lock, for example right in the field. In particular, manufacturing and installation tolerances may prevent quick and reliable assembly.

The present disclosure provides a belt clip set which can be mounted quickly and reliably so that such a belt clip set can be utilized to make the belt continuous (endless), for example in a field, following a defect in a simple manner. Another object is to specify a rod belt as well as a method for affixing the belt clip set.

The invention claimed is:

1. A belt clip set comprising a belt clip and at least two pilot bolts, the belt clip comprising:
   a first leg having at least two guide openings and
   a second leg having at least two thread openings each associated with the guide openings,
   each pilot bolt comprising at least:
   a threaded region with an external thread,
   a bolt head for tightening the pilot bolt and
   a tapered pin opposite the bolt head,
   wherein each pilot bolt is received with some play, at least in a longitudinal direction of the first leg, in one of the guide openings in the first leg and via said threaded region screwed into the respective associated thread opening in the second leg,
   the legs of the belt clip being connected to each other in such a manner that the two legs are drawn tight by tightening the at least two pilot bolts screwed into the thread openings and received with some play in the guide openings so as to clamp a belt end of a belt between the two legs.

2. The belt clip set of claim 1, the guide openings in the first leg each being designed as an extended oblong hole having a length, the length of the oblong hole being larger than an interior width of the oblong hole.

3. The belt clip set of claim 2, wherein the length of the oblong holes is at least about 7.2 mm and/or at least about 1.2 times of a bolt diameter in the threaded region of the pilot bolt.

4. The belt clip set of claim 2, wherein the oblong hole has an interior width that is smaller than a bolt head diameter of the bolt head so that the bolt head of the respective pilot bolt is able to retain the first leg upon tightening, where in the region of the oblong hole circumferential recesses are arranged, where the bolt head is received in the circumferential recesses such that the bolt head lies, at least in part, underneath a surface of the first leg.

5. The belt clip set of claim 4, wherein the oblong holes comprise a bevel in the region of the groove in such a way that in the mounted state a sloped region of the pilot bolts are in contact with the bevel.

6. The belt clip set of claim 2, wherein the length of the oblong hole is selected such that the pilot bolt, at least in the mounted state, does not come into contact with end regions of the oblong hole or the pilot bolt, at least in the mounted state, is in accurate contact with one of the end regions.

7. The belt clip set claim 1, wherein the pin is hardened and affixed to the pilot bolt in such a way that the pin, after the belt clip has been mounted, protrudes from the respective thread opening, whereas the pin is arranged to be severed or knocked off from the pilot bolt.

8. A rod belt for rod belt conveyors of agricultural machines, comprising
transverse rods arranged perpendicular to a direction of transport and parallel to one another, the transverse rods being mounted on continuous belts running parallel to one another at a pre-determined rod spacing on the belts,
where belt clips are attached to belt ends of the respective belt, the belt clips of the same belt being connected to each other for making the belt continuous, each belt clip comprising:
a first leg having at least two guide openings and
a second leg having at least two thread openings associated with the guide openings,
each belt clip being affixed to the belt ends via at least two pilot bolts and each pilot bolt comprising at least:
a threaded region having an external thread, and
a bolt head for tightening the pilot bolt,
where each pilot bolt is received with some play, at least in the direction of transport, in one of the guide openings in the first leg and is screwed via said threaded region into the respective thread opening in the second leg,
the legs being connected to each other and the two legs are drawn tight by the tightening of the at least two pilot bolts screwed into the thread openings and received with some play in the guide openings in such a manner that the belt end of the respective belt positioned between the two legs is clamped between the two legs.

9. The rod belt of claim 8, wherein the at least two guide openings in the first leg each being designed as an oblong hole extended in the direction of transport and having a length, the length of the oblong holes being selected such that the pilot bolts in the mounted state do not come into contact with end regions of the respective oblong hole or the pilot bolt, at least in the mounted state, is in accurately fitting contact with one of the end regions.

10. The rod belt of claim 9, wherein the two legs of the belt clip are connected to one another via bearing eyes, the bearing eyes being joined in the manner of hinges by belt clips, which are arranged on different belt ends of the same belt, and pivoting connected to one another so as to render the belt continuous.

11. The rod belt of claim 10, wherein the belt clips in the first leg have a first receptacle section and/or in the second leg have a second receptacle section, the first leg and/or the second leg in the respective receptacle section being shaped in such a way that the shape of the respective leg is adapted to a shape of the belt with or without a transverse rod on top thereof for clamping the belt together with a transverse rod on top thereof or without a transverse rod on top thereof.

12. The rod belt of claim 11, wherein an interior thread of the thread opening in the second leg is provided with a connecting means acting as a substance-to-substance bond for securing the pilot bolt against undesired detachment in operation of the rod belt.

13. A method for affixing a belt clip of a belt clip set of claim 1 to a belt end of a belt of a rod belt for rod belt conveyors, the rod belt comprising transverse rods arranged perpendicular to a direction of transport and parallel to one another, the transverse rods being attached to belts running in parallel to one another at a pre-determined rod spacing, comprising at least the following steps:
positioning the belt end of the belt between the legs of a belt clip provided;
tightening the two legs by means of at least two pilot bolts for clamping the belt end of the belt, in that
each pilot bolt is positioned, with the pin ahead, in one of the guide openings in the first leg of the belt clip;
a force and/or a torque is exerted on the respective positioned pilot bolt so as to thrust the pilot bolt in a channel through the belt until the threaded region of the pilot bolt is in contact with the respectively associated thread opening in the second leg of the belt clip;
the pilot bolt is tightened so that the pilot bolt with the threaded region is screwed into the associated thread opening, whereby the two legs are drawn tight as soon as the bolt head of the respective pilot bolt retains the first leg,
whereby the pilot bolt is received with some play at least in the direction of transport in the guide opening so that the pilot bolt moves in the guide opening upon exertion of a force and/or a torque on the pilot bolt as well as upon and/or after tightening of the pilot bolt.

14. The method of claim 13, wherein the channel in the belt is formed by the pin itself when the force and/or the torque is exerted on the pilot bolt.

* * * * *